(12) United States Patent
Yu et al.

(10) Patent No.: US 7,504,612 B2
(45) Date of Patent: Mar. 17, 2009

(54) AMBIENT LIGHT PROCESSING SYSTEM FOR CONTROLLING DISPLAY DEVICE BY SENSING AMBIENT LIGHT AND METHOD USING THE SYSTEM

(75) Inventors: Jae-suk Yu, Seoul (KR); Dong-yul Lee, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 54 days.

(21) Appl. No.: 11/745,551

(22) Filed: May 8, 2007

(65) Prior Publication Data

US 2008/0054159 A1    Mar. 6, 2008

(30) Foreign Application Priority Data

Aug. 30, 2006    (KR)    ................ 10-2006-0082918

(51) Int. Cl.
    *G09G 3/30*    (2006.01)
(52) U.S. Cl. ............ 250/206; 250/214 A; 250/214 AL; 345/42; 345/87; 345/81; 345/207
(58) Field of Classification Search ................ 250/206, 250/214 A, 214 AG; 345/55, 76, 211, 212, 345/214, 210, 207, 42, 87, 81
See application file for complete search history.

(56) References Cited

U.S. PATENT DOCUMENTS 6,396,217 B1 *   5/2002   Weindorf ................ 315/169.1

| 6,762,741 B2 * | 7/2004 | Weindorf ................ 345/102 |
| 7,095,392 B2 * | 8/2006 | Lin ............................. 345/87 |
| 2002/0011978 A1 * | 1/2002 | Yamazaki et al. ............. 345/87 |
| 2006/0001624 A1 * | 1/2006 | Lee ............................. 345/82 |

FOREIGN PATENT DOCUMENTS

| JP | 10-246879 | 9/1998 |
| KR | 1996-0001826 | 1/1996 |
| KR | 1020040018658 | 3/2004 |
| KR | 1020040106635 | 12/2004 |
| KR | 1020050123325 | 12/2005 |

* cited by examiner

*Primary Examiner*—Georgia Y Epps
*Assistant Examiner*—Tony Ko
(74) *Attorney, Agent, or Firm*—F. Chau & Assoc., LLC

(57) ABSTRACT

An ambient light processing system for controlling a display device by sensing ambient light and a method using the system. The ambient light processing system includes a photo-detector, an amplification unit, an analog-to-digital converter and a controller. The photo-detector outputs a sensed signal corresponding to the luminous intensity of the ambient light. The amplification unit amplifies the sensed signal with a high amplification factor to output a first amplified signal and amplifies the sensed signal with a low amplification factor to output a second amplified signal. The analog-to-digital converter respectively converts the first amplified signal and the second amplified signal into a first digital signal and a second digital signal. The controller outputs a first control signal and a second control signal for controlling the display device in response to the first digital signal and the second digital signal.

21 Claims, 7 Drawing Sheets

US 7,504,612 B2

AMBIENT LIGHT PROCESSING SYSTEM FOR CONTROLLING DISPLAY DEVICE BY SENSING AMBIENT LIGHT AND METHOD USING THE SYSTEM

CROSS-REFERENCE TO RELATED PATENT APPLICATION

This application claims the benefit of Korean Patent Application No. 10-2006-0082918, filed on Aug. 30, 2006, in the Korean Intellectual Property Office, the disclosure of which is incorporated herein in its entirety by reference.

BACKGROUND OF THE INVENTION

1. Technical Field

The present disclosure relates to a display control and, more particularly, to an ambient light processing system for controlling a display device by sensing ambient light and a method using the system.

2. Discussion of Related Art

Conventional ambient light processing systems control display devices in response to the luminous intensity of ambient light. Generally, when ambient light is input to a photo-diode, the photo-diode outputs t a voltage or current signal based on the intensity of the ambient light. The voltage or current signal output from the photo-diode is converted into a digital signal through an analog-to-digital converter. Noise is removed from the digital signal and then the digital signal, from which the noise has been removed, controls the display device.

The conventional ambient light processing system however, has difficulties in satisfying the following two conditions. The first condition is that the conventional ambient tight processing system should control the display device for ambient light over a wide range of luminous intensities. Specifically, the conventional ambient light processing system is required to control a light-emitting diode (LED) driver to adjust a back light of the display device in order to reduce power consumption when the ambient light is dark and control the back tight of the display device such that a displayed image is clearly seen when the ambient light is bright. The conventional ambient tight processing system may control the display device in the case of outdoor visibility such that a displayed image can be distinctly seen when the ambient light is as bright as natural light. The second condition is that the conventional ambient light processing system should control the display device in the case of low-frequency ambient light, in the case of low-frequency ambient light such as a fluorescent lamp, noise must be filtered to maintain the brightness of a displayed picture to be uniform. To control the display device for ambient light over a wide range of luminous intensities and low-frequency ambient light, however, the configuration of the conventional ambient light processing system becomes very complicated.

SUMMARY OF THE INVENTION

Exemplary embodiments of the present invention provide an ambient light processing system for preventing unnecessary power consumption and displaying frames in optimized states, while having an uncomplicated system configuration.

Exemplary embodiments of the present invention provide an ambient light processing method using the ambient light processing system.

According to an exemplary embodiment of the present invention, there is provided an ambient light processing system for controlling a display device by sensing ambient light, which system comprises a photo-detector, an amplification unit, an analog-to-digital converter, and a controller. The photodetector outputs a sensed signal corresponding to the sensed luminous intensity of the ambient light. The amplification unit amplifies the sensed signal with a high amplification factor to output a first amplified signal and also amplifies the sensed signal with a low amplification factor to output a second amplified signal. The analog-to-digital converter respectively converts the first amplified signal and the second amplified signal into a first digital signal and a second digital signal. The controller outputs respectively a first control signal and a second control signal for controlling the display device in response to the first digital signal and the second digital signal.

The controller may comprise a noise removal unit judging the first and second digital signals as noise when the frequencies of the first and second digital signals vary and filtering the first and second digital signals to output a first noise-removed signal and a second noise-removed signal, and a control signal generator outputting the first and second control signals in response to the first and second noise-removed signals.

The noise removal unit may judge the first digital signal as effective data only when results obtained by sampling the first digital signal continuously have the same value N times (where N is a natural number) and output the first noise-removed signal, and the noise removal unit may judge the second digital signal as effective data only when results obtained by sampling the second digital signal continuously have the same value N times and output the second noise-removed signal.

The first control signal may control an LED driver and the second control signal may control the outdoor visibility of the display device.

The ambient light processing system may further comprise a low-pass filter filtering a high-frequency component of the sensed signal and outputting the filtered signal to the amplification unit. The ambient light processing system may further comprise a hysteresis block classifying the first and second digital signals into predetermined sections divided in response to the luminous intensity of the ambient light and outputting the classified first and second digital signals to the controller.

The hysteresis block may comprise a first hysteresis block classifying the first digital signal into the sections divided in response to the luminous intensity of the ambient light and outputting the classified first digital signal, a second hysteresis block classifying the second digital signal into the sections divided in response to the luminous intensity of the ambient light and outputting the classified second digital signal and an arbitrator determining effective data in response to a luminous intensity difference between the output signals of the first and second hysteresis blocks.

The arbitrator may determine one of the output signals of the first and second hysteresis blocks having lower luminous intensity as the effective data.

According to an exemplary embodiment of the present invention, there is provided an ambient tight processing system for controlling a display device by sensing ambient light, which comprises a photo-detector, an amplification unit, an analog-to-digital converter, a noise removal unit and a control signal generator. The photo-detector outputs a sensed signal corresponding to the luminous intensity of the ambient light. The amplification unit amplifies the sensed signal. The analog-o-digital converter converts the amplified signal into a digital signal. The noise removal unit judges the digital signal as noise when the frequency of the digital signal varies and filters the digital signal. The control signal generator outputs a control signal for controlling the display device in response to the output signal of the noise removal unit. The noise removal unit judges the digital signal as effective data only when results obtained by sampling the digital signal continuously have the same value N times (where N is a natural number) and outputs the digital signal to the control signal generator.

According to an exemplary embodiment of the present invention, there is provided an ambient light processing method of controlling a display device by sensing ambient light, comprising: outputting a sensed signal corresponding to the luminous intensity of the ambient light; amplifying the sensed signal at a high amplification factor to output a first amplified signal and amplifying the sensed signal at a low amplification factor to output a second amplified signal; respectively converting the first amplified signal and the second amplified signal into a first digital signal and a second digital signal; and outputting a first control signal and a second control signal for controlling the display device in response to the first digital signal and the second digital signal.

The outputting of the first control signal and the second control signal may comprise judging the first and second digital signals as noise when the frequencies of the first and second digital signals are varied and filtering the first and second digital signals to output a first noise-removed signal and a second noise-removed signal.

The ambient light processing method may further comprise filtering a high-frequency component of the sensed signal, and the outputting of the first amplified signal and the second amplified signal may comprise amplifying the signal from which the high-frequency component has been filtered at a high amplification factor to output the first amplified signal and amplifying the signal from which the high-frequency component has been filtered at a low amplification factor to output the second amplified signal.

The outputting of the first control signal and the second control signal may comprise classifying the first and second digital signals into predetermined sections divided in response to the luminous intensity of the ambient tight and outputting the classified first and second digital signals, and outputting the first control signal and the second control signal in response to the classified first and second digital signals.

The ambient light processing method may further comprise determining effective data in response to a luminous intensity difference between the classified first and second digital signals.

According to an exemplary embodiment of the present invention, there is provided an ambient light processing method of controlling a display device by sensing ambient light, comprising: outputting a sensed signal corresponding to the luminous intensity of the ambient light, amplifying the sensed signal and converting the amplified signal into a digital signal; judging the digital signal as noise when the frequency of the digital signal varies and filtering the digital signal; and outputting a control signal for controlling the display device in response to the filtered signal. The filtering of the digital signal comprises judging the digital signal as effective data only when results obtained by sampling the digital signal continuously have the same value N times (where N is a natural number).

BRIEF DESCRIPTION OF THE DRAWINGS

Exemplary embodiments of the present invention will be understood in more detail from the following descriptions taken in conjunction with the attached drawings, in which.

DETAILED DESCRIPTION OF EXEMPLARY EMBODIMENTS

Figure 1:
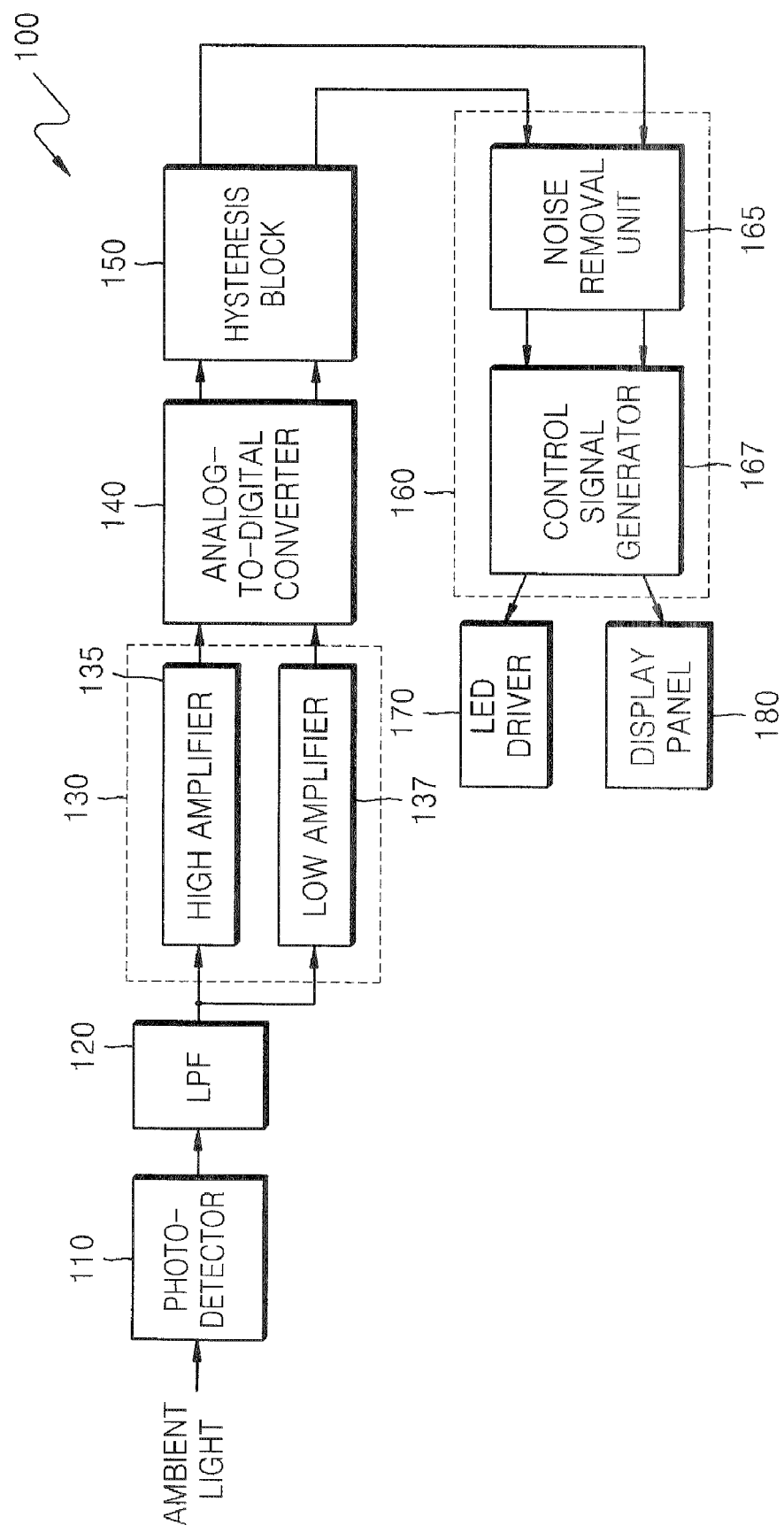
FIG. 1 is a block diagram of an ambient light processing system according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Throughout the drawings, like reference numerals refer to like elements.

FIG. 1 is a block diagram of an ambient light processing system 100 according to an exemplary embodiment of the present invention. Referring to FIG. 1, the ambient light processing system 100 includes a photo-detector 110, a low-pass filter (LPF) 120, an amplification unit 130, an analog-to-digital converter 140, a hysteresis block 150, and a controller 160.

The photo-detector 110 of the ambient light processing system 100 receives ambient light and outputs a sensed signal corresponding to the luminous intensity of the received ambient light. The photo-detector 110 may be configured in the form of a photo-diode. The LPF 120 filters a high-frequency component of the sensed signal. The signal output from the LPF 120 is input to the amplification unit 130. The amplification unit 130 includes a high amplifier 135 and a low amplifier 137. The high amplifier 135 amplifies its input signal with a high amplification factor and the low amplifier 137 amplifies its input signal with a low amplification factor. It is preferable that the amplification operations of the high amplifier 135 and the low amplifier 137 are sequentially performed. For example, the high amplifier 135 amplifies its input signal and outputs the amplified signal while a frame is being displayed, and then the low amplifier 137 amplifies its input signal and outputs the amplified signal while the next frame is being displayed. The analog-to-digital converter 140 converts the output signals of the high amplifier 135 and the low amplifier 137 into digital signals. The hysteresis block 150 receives the digital signals of the analog-to-digital converter 140 and classifies the digital signals into predetermined sections divided in response to the luminous intensity of the ambient light. The hysteresis block 150 filters an intermediate frequency component according to the classification of the digital signals. The controller 160 includes a noise removal unit 165 and a control signal generator 167. The noise removal unit 165 filters noise generated when low-frequency ambient light is input to the ambient light processing system 100. The control signal generator 167 receives the signals from which the noise has been removed by the noise removal unit 165 and generates control signals for controlling a display device. More specifically, a control signal generated by the control signal generator 167 in response to the signal amplified by the high amplification factor by the high amplifier 135 controls an LED driver 170 in order to control a back light of the display device, and a control signal generated by the control signal generator 167 in response to the signal amplified by the low amplification factor by the low amplifier 137 is fed to a display panel 180 to control the outdoor visibility of the display device.

Figure 2:
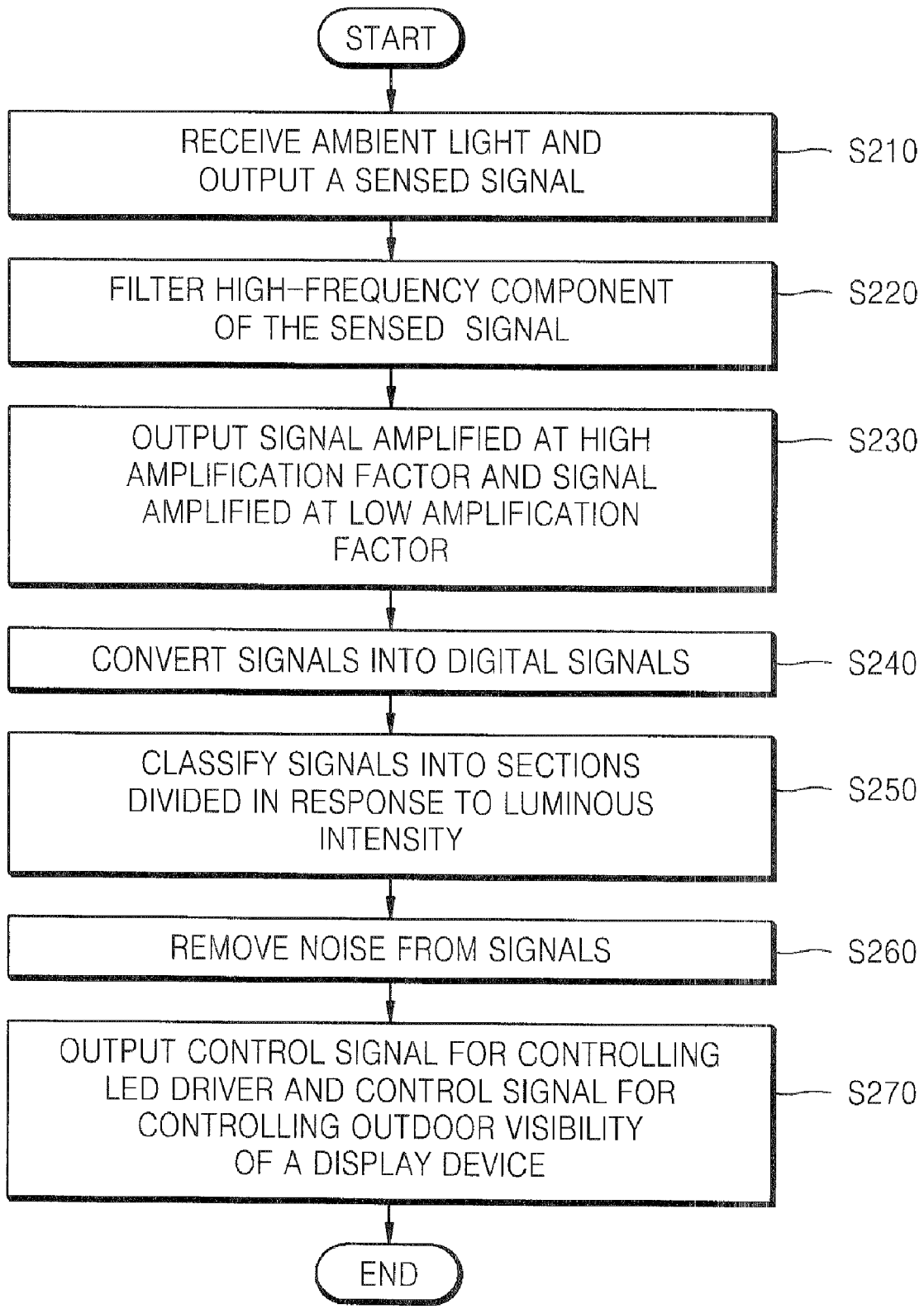
FIG. 2 illustrates a flow chart of an ambient light processing method according to an exemplary embodiment of the present invention.

FIG. 2 is a flow chart illustrating an ambient light processing method according to an exemplary embodiment of the present invention. The ambient light processing method according to an exemplary embodiment of the present invention will be explained with reference to FIGS. 1 and 2. Specifically, a method of controlling ambient light in a wide range of luminous intensities and a method of filtering noise of low-frequency ambient light according to an exemplary embodiment of the present invention will be explained in relation to the system shown in FIG. 1. Both methods may be independently executed.

The photo-detector 110 receives ambient light and outputs a sensed signal corresponding to the luminous intensity of the ambient light in operation S210. It is assumed that the photo-detector 110 is a photo-diode and the photo-diode outputs a photo-current as the sensed signal.

The LPF 120 receives the photo-current and filters a high-frequency component of the photo-current in operation S220. Assuming that the LPF 120 filters signals having frequencies higher than 100 Hz, only signals having frequencies lower than 100 Hz can pass through the LPF 120. Since high-frequency signals are difficult to amplify by the amplification unit 130, the LPF 120 filters high-frequency signals and only signals that can be amplified by the amplification unit 130 are output from the LPF 120 to the amplification unit 130.

The amplification unit 130 outputs a signal amplified at a high amplification factor and a signal amplified at a low amplification factor in operation S230.

Figure 3:
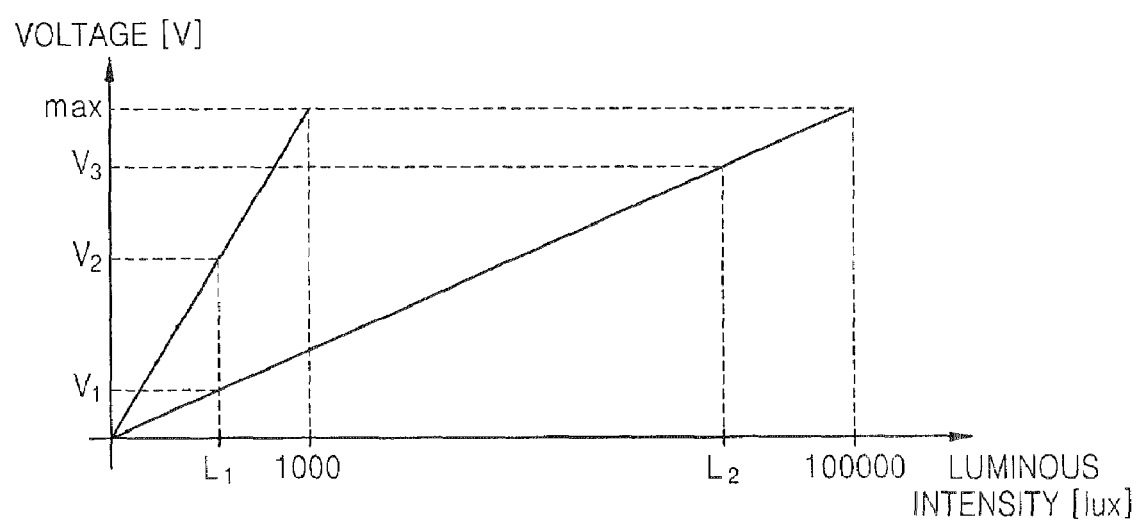
FIG. 3 is a graph illustrating an amplification result of an amplification unit of the ambient light processing system illustrated in FIG. 1 according to an exemplary embodiment of the present invention.

FIG. 3 is a graph illustrating an amplification result of the amplification unit 130 of the ambient light processing system illustrated in FIG. 1, according to an exemplary embodiment of the present invention.

The operation of the amplification unit 130 will be explained with reference to FIGS. 1, 2 and 3. When the luminous intensity of the ambient light is low, the high amplifier 135 amplifies its input signal to minutely divide the luminous intensity of the ambient light. When the luminous intensity of the ambient light is high, the low amplifier 137 amplifies its input signal to roughly divide the luminous intensity of the ambient light. For example, when the high amplifier 135 amplifies its input signal with an amplification factor of 10 and the low-level amplifier 137 amplifies its input signal with an amplification factor of 1, the output signal voltage of the high amplifier 135 becomes V2 and the output signal voltage of the low amplifier 137 becomes V1 when the luminous intensity of the ambient light is L1. When the luminous intensity of the ambient light is gradually increased to exceed 1000 lux, the signal amplified with the amplification factor 10 by the high amplifier 135 is not output and only the signal amplified with the amplification factor of 1 by the low amplifier 137 is output. When the luminous intensity of the ambient light is L2, the output signal voltage of the low amplifier 137 becomes V3.

It is preferable that the operations of the amplification unit 130 be sequentially executed, when amplification is performed once while a first frame is displayed, for example, the high amplifier 135 receives information of the ambient light, amplifies the information by an amplification factor of 10 and outputs the amplified signal while the first frame is displayed. The low amplifier 137 receives the information of the ambient light, amplifies the information of the ambient light at an amplification factor of 1 and outputs the amplified signal while a second frame following the first frame is displayed. Since a time period for which a single frame is displayed is very short, the luminous intensity of the ambient light that is amplified by an amplification factor of 10 is similar to the luminous intensity of the ambient light amplified by an amplification factor of 1. The case where there is a large difference in both luminous intensities of the ambient light that is amplified by an amplification factor of 10 and the luminous intensity of the ambient light amplified by an amplification factor of 1 will be explained hereinbelow with reference to FIG. 7. The ambient tight processing system 100 controls the display device using the output signals of the amplification unit 130 when the display device displays the next frame, for example, a third frame or a fourth frame.

The signals output from the amplification unit 130 are analog signals. Accordingly, the analog-to-digital converter 140 converts the analog signals into digital signals in operation S240. When an ambient light having a high luminous intensity and an ambient light having a low luminous intensity are not respectively amplified with different amplification factors, an analog-to-digital converter having a large number of bits is required. Exemplary embodiments of the present invention, however, can use a conventional analog-to-digital converter because ambient light having a high luminous intensity and ambient light having a low luminous intensity are respectively amplified with different amplification factors. It is preferable that the analog-to-digital conversion be executed in a so-called porch period having less noise after a single frame has been displayed.

The hysteresis block 150 classifies the digital signals into predetermined sections divided in response to the luminous intensity of the ambient light in operation S250.

Figure 4:
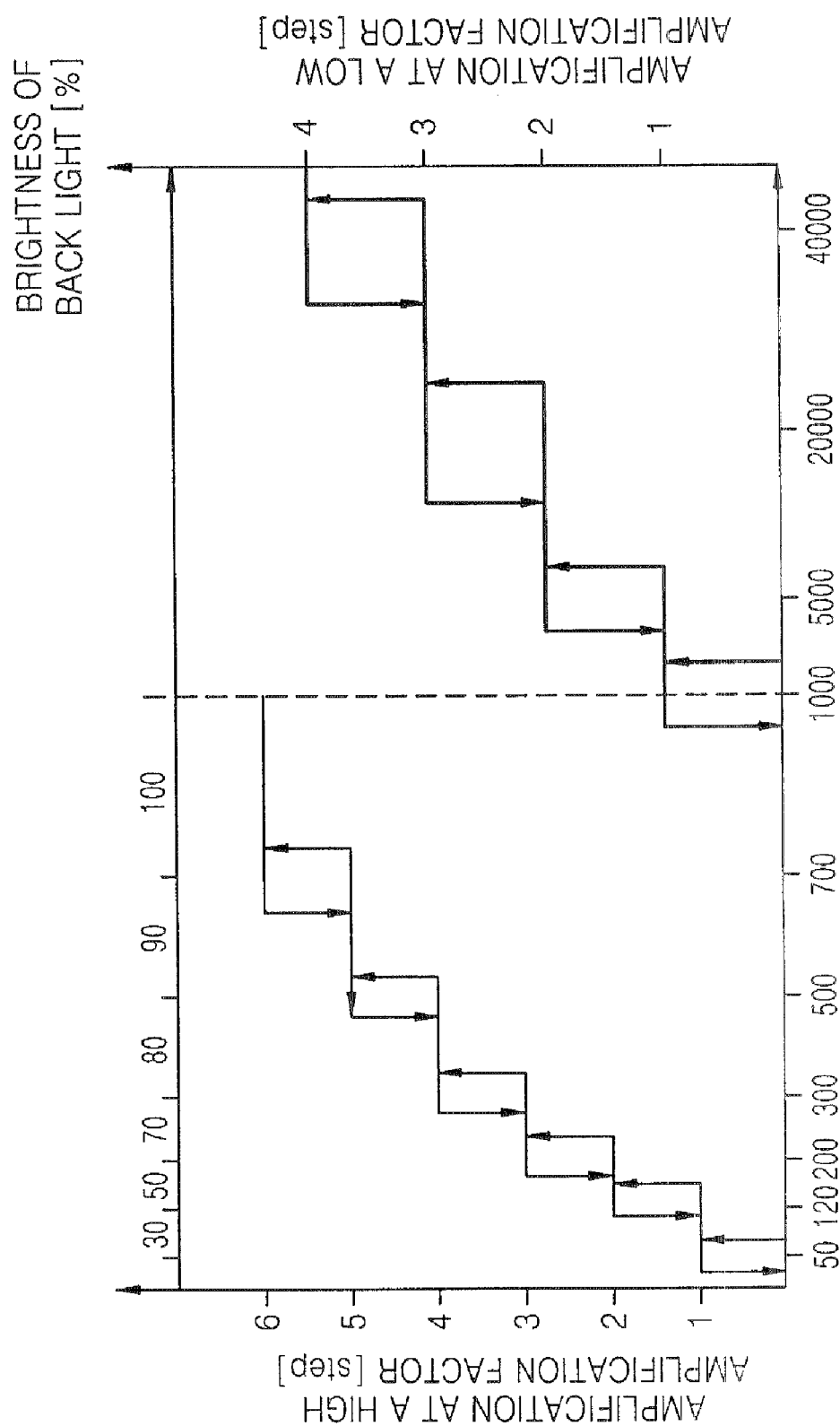
FIG. 4 is a graph for explaining the operation of a hysteresis block of the ambient light processing system illustrated in FIG. 1, according to an exemplary embodiment of the present invention.

FIG. 4 is a graph for explaining the operation of the hysteresis block 150. In FIG. 4, luminous intensities lower than 1000 lux are divided into six stages and luminous intensities higher than 1000 lux are divided into four stages. The number of stages is not limited to six or four, however, and can vary according to the internal design of the system.

Referring to FIG. 4, in the case of amplification with a high amplification factor, the first stage corresponds to 30% of the brightness of a back light, the second stage corresponds to 50% of the brightness of the back light, the third stage corresponds to 70% of the brightness of the back light, the fourth stage corresponds to 80% of the brightness of the back lights the fifth stage corresponds to 90% of the brightness of the back light, and the sixth stage and luminous intensities higher than 1000 lux correspond to 100% of the brightness of the back light. Accordingly, the ambient light processing system 100 can control the brightness of the back light in response to the luminous intensity of the ambient light. For example, when the ambient light is 70 lux, the ambient light corresponds to the first stage and, thus, the brightness of the back light is controlled to 30% brightness. Also, when the ambient light is 600 lux, the ambient light corresponds to the fifth stage and, thus, the brightness of the back light is controlled to 90% brightness. In the case of amplification with a low amplification factor, the luminous intensities are divided into stages in the same manner as described above to control outdoor visibility in response to the luminous intensity of the ambient light.

The hysteresis block 150 filters noise of intermediate frequency signals, which is not filtered by the LPF 120. That is, the hysteresis block 150 filters noise of frequency signals of tens of Hz through 100 Hz. Noise of a low-frequency signal, for example, the frequency of a fluorescent lamp, 60 Hz, however, cannot be filtered by the hysteresis block 150.

The noise removal unit 165 of the controller 160 removes noise from the output signals of the hysteresis block 150 in operation S260. That is, the noise removal unit 165 can remove noise of a low-frequency signal, which cannot be removed by the hysteresis block 150. The operation of the noise removal unit 165 will be explained later in detail with reference to FIGS. 5 and 6.

The signal, which is output from the noise removal unit 165 in response to the signal amplified by the high amplifier 135, controls the LED driver 170 in order to control the back light. The signal which is output from the noise removal unit 165 in response to the signal amplified by the low amplifier 137, is used to control outdoor visibility of the display panel 180. The control of the LED driver 170 and the control of outdoor visibility of the display panel 180, however, are not related to the function of the noise removal unit 165. That is, the ambient light processing system 100 of the exemplary embodiment of the present invention can control the LED driver 170 and outdoor visibility of the display panel 180 even when the ambient light processing system 100 does not include the noise removal unit 165 because the noise removal unit 165 simply removes noise of a low-frequency signal.

Figure 5:
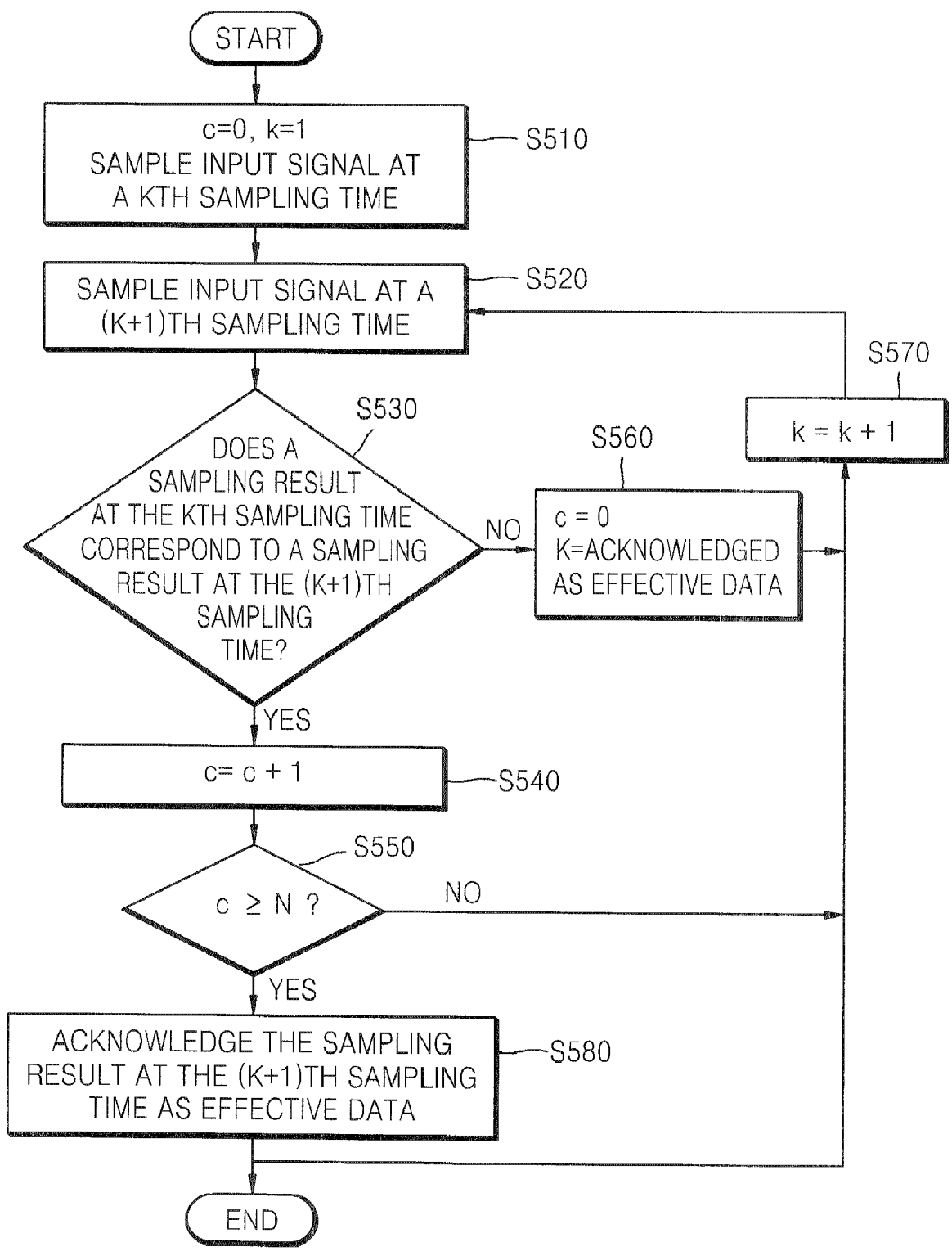
FIG. 5 illustrates a flow chart of a noise removal operation of the ambient light processing method illustrated in FIG. 2, according to an exemplary embodiment of the present invention.
Figure 6:
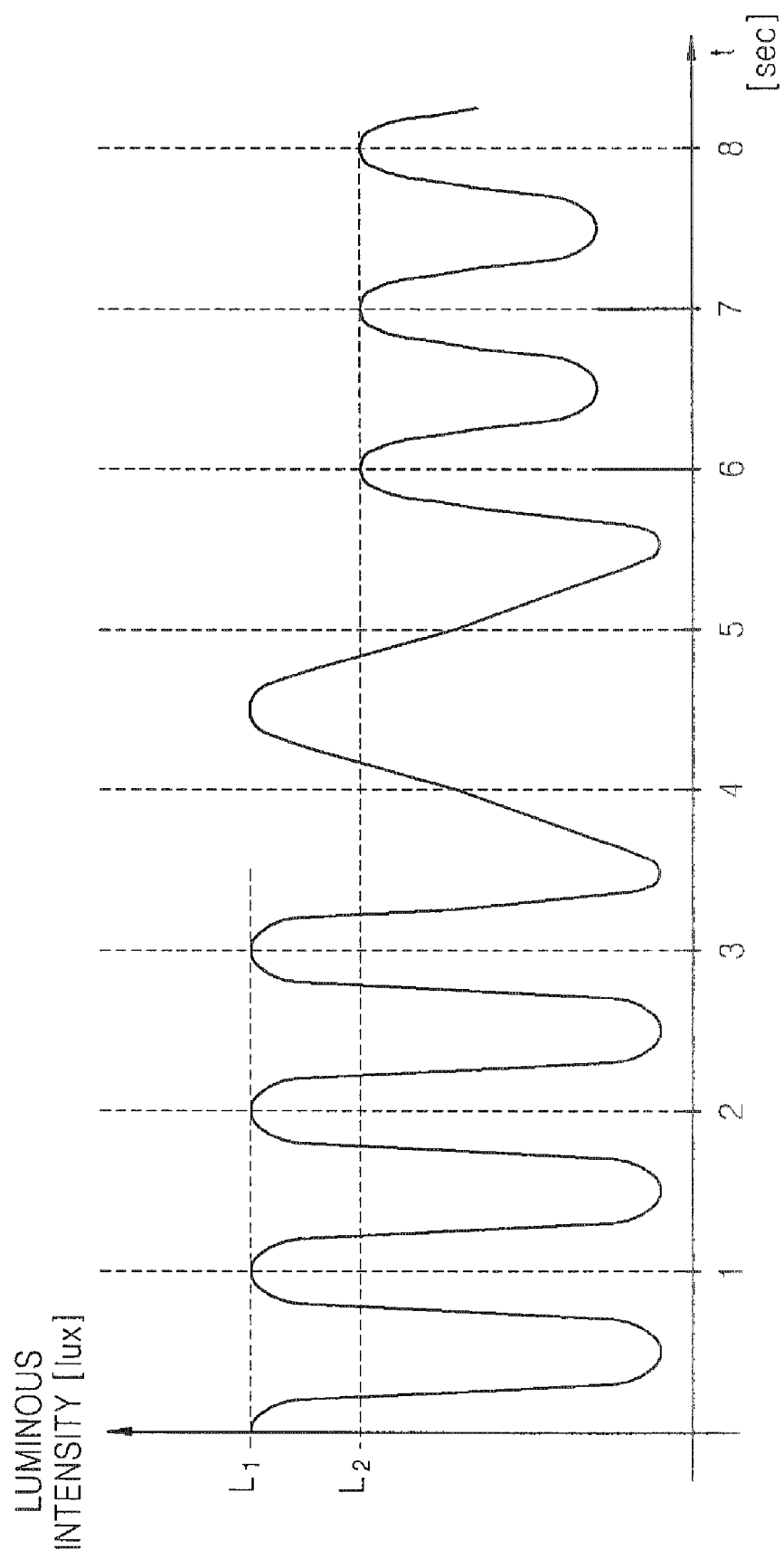
FIG. 6 is a graph for explaining a noise removal method illustrated in FIG. 5.

FIG. 5 illustrates a flow chart of the noise removal operation S260 of the ambient light processing method illustrated in FIG. 2, and FIG. 6 is a graph for explaining the noise removal operation S260 illustrated in FIG. 5, according to exemplary embodiments of the present invention.

Referring to FIGS. 1, 5, and 6, when the frequency of a signal input to the noise removal unit 165 varies, the noise removal unit 165 judges whether the input signal has noise and filters the input signal accordingly. It is assumed that the signal input to the noise removal unit 165 is sampled every second and, when the sampling results continuously have the same value twice (N=2, where N is value that is a standard of comparing the number of samples having the same value to decide whether the input signal is effective data), the signal input to the noise removal unit 165 is judged to be effective data. That is, the luminous intensity is L1, see FIG. 6, when the signal is sampled at a first sampling time (S510), and the luminous intensity is also L1 when the signal is sampled at a second sampling time (S520). When both sampling results are compared to each other (S530), both sampling results have the same luminous intensity L1. Thus, a variable c is assigned a value of 1 (S540). In this case, the variable c (c=1) is less than N (N=2) and, thus, the signal is sampled at a third sampling time (S570). The sampling result at the third sampling time has the luminous intensity L1, which corresponds to the sampling result at the second sampling time (S530) and, thus, the variable c becomes 2 (S540). In this case, the variable c (c=2) is equal to N (N=2) (S550) and, thus, the luminous intensity L1 and the sampling result at the third sampling time, is output as effective data (S580). That is, the noise removal unit 165 judges the luminous intensity of the ambient light as L1 from the sampling results until the third sampling time and outputs a signal corresponding to the luminous intensity L1, Subsequently, the sampling result at the fourth sampling time is not at the luminous intensity L1 (S520 and S530) and, thus, the variable c is initialized to 0 (S560). Similarly, the sampling results at a fifth sampling time and a sixth sampling time do not have the luminous intensity L1 (S530) and, thus, the variable c is still the initial value of 0 (S560). The sampling result at a seventh sampling time is at the luminous intensity L2, see FIG. 6, which is identical to the sampling result at the sixth sampling time (S520, S530). Accordingly, the variable c is assigned 1 (S540). Since the variable c (c=1) is less than N (N=2) (S550), the signal is sampled at an eighth sampling time (S570). The sampling result at the eighth sampling time corresponds to the luminous intensity L2, which is identical to the sampling result at the seventh sampling time (S530) and, thus, the variable C becomes 2 (S540). Since the variable c (c=2) is identical to N (N=2) (S550), the luminous intensity L2 and the sampling result at the eighth sampling time, is judged as effective data (S580). That is, the luminous intensity of the ambient light from the third sampling time to the seventh sampling time is acknowledged as luminous intensity L1 and the luminous intensity after the eighth sampling time is acknowledged as luminous intensity L2. The aforementioned process is repeated in order to judge the luminous intensity of the ambient light.

Accordingly, the luminous intensity of the ambient light can be judged as a specific value based on previous data even at the fourth sampling time and the fifth sampling time when a noise signal, that is, a signal having a frequency varying instantaneously, is input to the noise removal unit 165. Therefore, the ambient light processing system according to exemplary embodiments of the present invention can control the display device, even when the frequency of an input signal varies instantaneously due to internal or external causes.

The noise removal unit 165 is operated as described above for a single input signal. When a signal amplified at a high amplification factor and a signal amplified at a low amplification factor are input to the noise removal unit 165 having a time difference between the signal amplified at a high amplification factor and the signal amplified at a low amplification factor, the noise removal unit 165 performs the aforementioned operation for each of the signals to remove noise from both signals.

Figure 7:
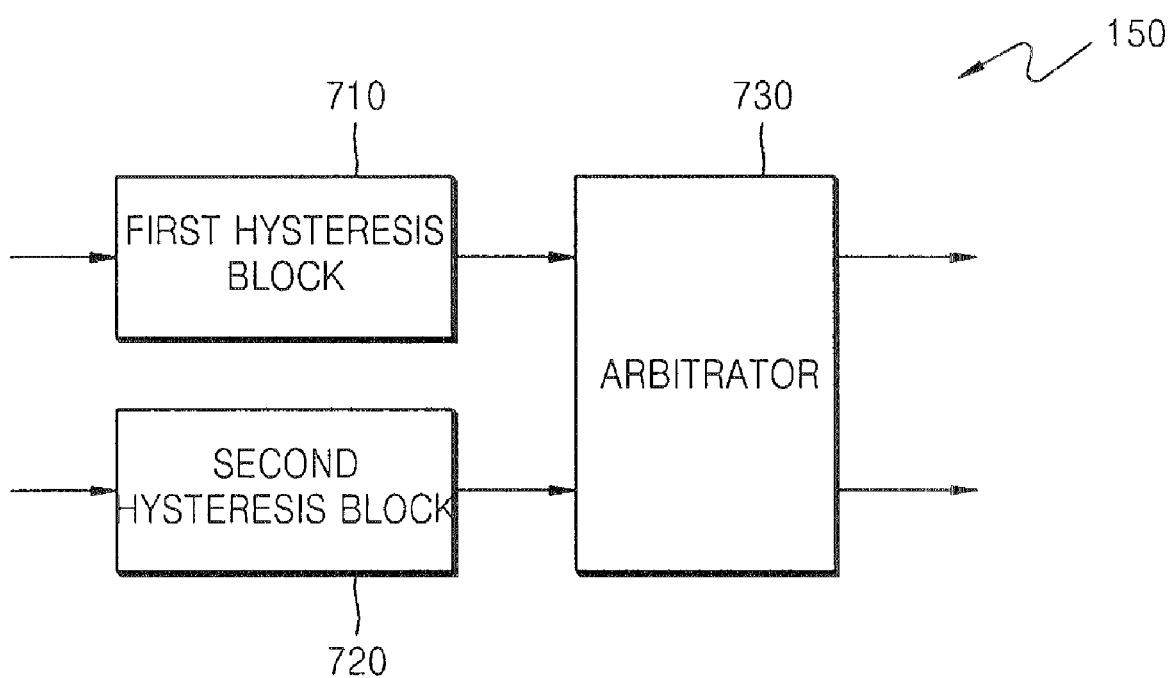
FIG. 7 is a block diagram of the hysteresis block of the ambient light processing system illustrated in FIG. 1 according to an exemplary embodiment of the present invention.

FIG. 7 is a block diagram of the hysteresis block 150 of the ambient light processing system illustrated in FIG. 1, according to an exemplary embodiment of the present invention. Referring to FIG. 7, the hysteresis block 150 can arbitrate a case where there is a large luminous intensity difference between a signal amplified at a high amplification factor and a signal amplified at a low amplification factor. The hysteresis block 150 includes a first hysteresis block 710 receiving a digital signal corresponding to the signal amplified at a high amplification factor, a second hysteresis block 720 receiving a digital signal corresponding to the signal amplified at a low amplification factor, and an arbitrator 730 arbitrating the output signals of the first and second hysteresis blocks 710 and 720.

The operation of the hysteresis block 150 will be explained with reference to FIGS. 4 and 7. For example, a signal amplified at an amplification factor of 10 corresponds to 250 lux so that the signal amplified at an amplification factor of 10 is judged to be at the third stage and a signal amplified at an amplification factor of 1 corresponds to 1000 lux so that the signal amplified at an amplification factor of 1 is judged to be at the second stage. The luminous intensities of the signal amplified at an amplification factor of 10 and the signal amplified at an amplification factor of 1 are similar to each other in a normal state. The aforementioned example, however, corresponds to a dark place that instantaneously brightens. For example, light flickering in a dark theater. In this case, the arbitrator 730 arbitrarily determines only one of the signals as effective data. If the arbitrator 730 determines the signal having low luminous intensity as effective data, the hysteresis block 150 outputs a value corresponding to the luminous intensity of 250 lux.

As described above, the ambient light processing system and the method using the system according to exemplary embodiments of the present invention can control ambient light in a wide range of luminous intensities and can filter noise of low-frequency ambient light to prevent unnecessary power consumption with an uncomplicated system configuration. Furthermore, exemplary embodiments of the present invention can display frames in optimized states.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An ambient light processing system for controlling a display device by sensing ambient light, comprising:
    a photo-detector outputting a sensed signal corresponding to a luminous intensity of the ambient light;
    an amplification unit amplifying the sensed signal with a high amplification factor to output a first amplified signal and amplifying the sensed signal with a low amplification factor to output a second amplified signal;
    an analog-to-digital converter respectively converting the first amplified signal and the second amplified signal into a first digital signal and a second digital signal; and
    a controller outputting respectively a first control signal and a second control signal for controlling the display device in response to the first digital signal and the second digital signal.

2. The ambient light processing system of claim 1, wherein the controller comprises:
    a noise removal unit judging the first and second digital signals as noise when frequencies of the first and second digital signals vary and filtering the first and second digital signals to output a first noise-removed signal and a second noise-removed signal; and
    a control signal generator respectively outputting the first and second control signals in response to the first and second noise-removed signals.

3. The ambient light processing system of claim 2, wherein the noise removal unit judges the first digital signal as effective data only when results obtained by sampling the first digital signal continuously have a same value N times (where N is a natural number) and outputs the first noise-removed signal, and the noise removal unit judges the second digital signal as effective data only when results obtained by sampling the second digital signal continuously have a same value N times and outputs the second noise-removed signal.

4. The ambient light processing system of claim 1, wherein the first control signal controls an LED driver.

5. The ambient light processing system of claim 1, wherein the second control signal controls outdoor visibility of the display device.

6. The ambient light processing system of claim 2, further comprising a low-pass filter filtering a high-frequency component of the sensed signal and outputting the filtered signal to the amplification unit.

7. The ambient light processing system of claim 1, further comprising a hysteresis block classifying the first and second digital signals into predetermined sections divided in response to the luminous intensity of the ambient light and outputting the classified first and second digital signals to the controller.

8. The ambient light processing system of claim 7, wherein the hysteresis block comprises:
    a first hysteresis block classifying the first digital signal into the sections divided in response to the luminous intensity of the ambient light and outputting the classified first digital signal;
    a second hysteresis block classifying the second digital signal into the sections divided in response to the luminous intensity of the ambient light and outputting the classified second digital signal; and
    an arbitrator determining effective data in response to a luminous intensity difference between the output signals of the first and second hysteresis blocks.

9. The ambient light processing system of claim 8, wherein the arbitrator determines one of the output signals of the first and second hysteresis blocks having lower luminous intensity as the effective data.

10. The ambient light processing system of claim 1, wherein the amplification unit outputs the first amplified signal and then sequentially outputs the second amplified signal.

11. The ambient light processing system of claim 10, wherein the amplification unit outputs the first amplified signal while the display device displays a frame and outputs the second amplified signal while the display device displays the next frame.

12. An ambient light processing method of controlling a display device by sensing ambient light, comprising:
    outputting a sensed signal corresponding to a luminous intensity of the ambient light;
    amplifying the sensed signal with a high amplification factor to output a first amplified signal and amplifying the sensed signal with a low amplification factor to output a second amplified signal;
    respectively converting the first amplified signal and the second amplified signal into a first digital signal and a second digital signal; and
    outputting a first control signal and a second control signal for controlling the display device respectively in response to the first digital signal and the second digital signal.

13. The ambient light processing method of claim 12, wherein the outputting of the first control signal and the second control signal comprises judging the first and second digital signals as noise when frequencies of the first and second digital signals are varied and filtering the first and second digital signals to output a first noise-removed signal and a second noise-removed signal.

14. The ambient light processing method of claim 13, wherein the filtering of the first and second digital signals comprises:
    judging the first digital signal as effective data only when results obtained by sampling the first digital signal have a same value N times (N is a natural number) successively and outputting the first noise-removed signal; and judging the second digital signal as effective data only when results obtained by sampling the second digital signal have a same value N times successively and outputting the second noise-removed signal.

15. The ambient light processing method of claim 12, further comprising controlling an LED driver using the first control signal.

16. The ambient light processing method of claim 12, further comprising controlling outdoor visibility of the display device using the second control signal.

17. The ambient light processing method of claim 12, further comprising filtering a high-frequency component of the sensed signal the outputting of the first amplified signal and the second amplified signal comprising amplifying the signal from which the high-frequency component has been filtered with a high amplification factor to output the first amplified signal and amplifying the signal from which the high-frequency component has been filtered with a low amplification factor to output the second amplified signal.

18. The ambient light processing method of claim 12, wherein the outputting of the first control signal and the second control signal comprises:

classifying the first and second digital signals into predetermined sections divided in response to the luminous intensity of the ambient light and outputting the classified first and second digital signals; and outputting the first control signal and the second control signal in response to the classified first and second digital signals.

19. The ambient light processing method of claim 18, further comprising determining effective data in response to a luminous intensity difference between the classified first and second digital signals.

20. The ambient light processing method of claim 19, wherein the determining of the effective data comprises determining one of the classified first and second digital signals, which has lower luminous intensity, as the effective data.

21. The ambient light processing method of claim 12, wherein the outputting of the first amplified signal and the second amplified signal comprises:

outputting the first amplified signal while the display device displays a frame; and outputting the second amplified signal while the display device displays a next successive frame after outputting the first amplified signal.

* * * * *